United States Patent
Pedersen et al.

(10) Patent No.: US 6,228,925 B1
(45) Date of Patent: *May 8, 2001

(54) TWO-STAGE SEED SWELLING PROCEDURE FOR PRODUCING MONODISPERSE PVC PARTICLES

(75) Inventors: Steinar Pedersen, Skein; Arvid Berge, Trondheim; Harald Jacobsen, Stathelle; Kari-Anne Leth-Olsen, Trondheim; Bård Sæthre, Porsgrunn; John Ugelstad deceased, late of Trondheim, all of (NO), by Viola Sommervold, legal representative

(73) Assignee: Norsk Hydro ASA, Oslo (NO)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 77 days.

(21) Appl. No.: 09/171,672

(22) PCT Filed: Apr. 21, 1997

(86) PCT No.: PCT/NO97/00106
§ 371 Date: Feb. 9, 1999
§ 102(e) Date: Feb. 9, 1999

(87) PCT Pub. No.: WO97/40076
PCT Pub. Date: Oct. 30, 1997

(30) Foreign Application Priority Data

Apr. 23, 1996 (NO) ........................................ 961625

(51) Int. Cl.$^7$ .......................... C08F 14/06; C08F 257/00; C08F 265/04; C08F 289/00; C08L 27/06
(52) U.S. Cl. ......................... 524/458; 524/834; 525/313; 526/344; 526/909
(58) Field of Search ..................... 524/458, 834; 525/317; 526/344, 909

(56) References Cited

U.S. PATENT DOCUMENTS 4,071,670 * 1/1978 Vanzo et al. ........................ 526/88
4,694,035   9/1987 Kasai et al. .
5,147,937   9/1992 Frazza et al. .

FOREIGN PATENT DOCUMENTS 0 476 743   3/1992 (EP) .

OTHER PUBLICATIONS

Derwent WPI, abstract of JP 61–190504 (Aug./1986).
Derwent WPI, abstract of JP 61–215604 (Sep./1986).
Derwent WPI, abstract of JP 61–215605 (Sep./1986).
M. Bunten, *Encyclopedia of Polymer Science and Technology*, 2nd Ed., vol. 17, pp. 329–376 (1982).
R. Sudduth, *J. Appl. Poly. Sci.*, 48, 37–55 (1993).
A. Paine, *J. Poly. Sci.*, Part A, vol. 27, 2485–2500 (1990).
S. Shen et al., *J. Poly. Sci.*, Part A, vol, 31, 1393–1402 (1993).
P. Smallwood, *Encyclopedia of Polymer Science and Technology*, $2^{nd}$ Ed., vol. 17, pp. 295–329 (1982).
M. Bunten, Encyclopedia of Polymer Science and Technology (1982), 2nd Ed., vol. 17, pp. 329–276.*

* cited by examiner

*Primary Examiner*—David W. Wu
*Assistant Examiner*—K. Egwim
(74) *Attorney, Agent, or Firm*—Wenderoth, Lind & Ponack, L.L.P.

(57) ABSTRACT

A procedure for the production of PVC particles with a narrow size distribution in the range 10–50 $\mu$m, preferably 10–30 $\mu$m, in which, in a first stage, a vinyl monomer or a mixture of monomers is polymerised to form a polymer/oligomer seed particle in the range 1–10 $\mu$m. In a second stage, another vinyl monomer or mixture of monomers is swelled into the polymer/oligomer seed particles and polymerisation takes place in such a way that they grow into polymer particles of the desired size. It is preferable to use aromatic vinyl monomers or acrylates as the monomer in the seed particles. The seed particles in the first stage can be produced in a two-stage swelling process or by dispersion polymerisation.

11 Claims, 2 Drawing Sheets

TWO-STAGE SEED SWELLING PROCEDURE FOR PRODUCING MONODISPERSE PVC PARTICLES

After polyethylene, polyvinyl chloride (PVC) is the most widespread plastic raw material in the world. In Western Europe alone, more than 5 million tonnes are used annually. The area of application is very wide, ranging from hard products such as pipes, profiles and calendered sheeting to plasticised products such as electrical cables, hoses and films. Both compact and foamed articles are common. S-PVC, which is the dominant product variant, is produced by suspension polymerisation to form particles in the range 100 to 200 μm.

Paste PVC is another product type which accounts for approximately 10% of total PVC consumption. It is produced by means of various variants of emulsion polymerisation and the latexes produced are dried to form fine-grained polymer particles. The primary particles in latex may typically be from 0.1 to 2 μm, depending on the technique used. Very special processes can produce particles right up to 5 μm. The most common drying technique is spray drying, which also produces a number of secondary particles of various sizes. This powder is dispersed in a solvent, the plasticiser, to form a liquid plastisol or paste. Processing takes place in liquid form in processes such as coating (reverse roll-coating, knife coating, screen coating), gravure and screen printing, rotation casting, shell casting and dipping. The most important product areas are floorings, wallpaper, tarpaulins, rainwear, plating and gloves.

Filler PVC (extender resin) is a special product which is mixed with standard paste PVC in plastisol formulations to produce the best possible flow, at both high and low shear rates during the processing process. The admixture of filler PVC will also be favourable for the flow of the resulting plastisol in cases in which there is a desire to reduce the content of plasticiser in the formulation or possibly to use high-molecular plasticisers with low vapour pressure. The reason for this is that a mixture of small and large particles produces a denser degree of packing and thus a less efficient particle concentration. A greater proportion of plasticiser is then free to produce flow in the plastisol. Existing filler PVC products are produced by suspension polymerisation. Particle sizes under 60 μm are achieved by means of special measures such as the use of surfactants and changed agitation conditions.

Products with an average diameter in the range 35–45 μm are the market leaders. However, it is very difficult, with this technique, to produce narrow size distributions and the products therefore usually contain a certain fraction of particles over 60 μm as well. This represents a major restriction in the area of application because processes such as thin film coating, coil-coating, can-coating, wallpaper production and printing processes require very fine-particle media. With a particle size of 40 to 50 μm, it is not possible to produce films thinner than 100 μm. Known techniques within this area are described thoroughly by M. J. Bunten in the Encyclopedia of Polymer Science and Technology; Vinyl Chloride Polymers, Polymerization, $2^{nd}$ ed., Vol. 17, 1982, which is hereby used as a reference.

An article by R. D. Sudduth (J. of Applied Polymer Science, 48, 37–55 (1993)) states that when the ratio between the diameters of large and small particles exceeds 10, the maximum degree of packing is achieved. This means that a mixture of 20 and 2 micron particles will be equally as favourable as a mixture of 40 and 2 micron particles and equally good flow conditions in the plastisol can be expected. Therefore, it is unnecessary to have large particles which restrict the area of application.

The purpose of the present invention is to produce PVC particles with a narrow size distribution in the range 10 to 50 microns. Another purpose is to produce spherical, almost monodisperse PVC particles in the range 10 to 50 microns and to use such particles in formulations and processes for the production of products based on paste PVC techniques.

These and other purposes of the present invention are achieved with a procedure, product and application as described below. The present invention is also described and characterised by the attached claims.

The present invention concerns a procedure for producing PVC particles with a narrow size distribution in the range 10–50 μm, preferably 10–30 μm, in which, in a first stage, a vinyl monomer or a mixture of monomers is polymerised to form a polymer/oligomer seed particle in the range 1–10 μm. In a second stage, another vinyl monomer or mixture of monomers is swelled into polymer/oligomer seed particles and the polymerisation takes place in such a way that they grow into polymer particles of the desired size. The use of aromatic vinyl monomers or acrylates as the monomers in the seed particles is preferred. The seed particles in the first stage can be produced by means of a two-stage swelling process or by dispersion polymerisation. If dispersion polymerisation is used, it is preferable to initiate the polymerisation by dosing a pre-heated mixture of initiator and solvent so that the temperature in the medium does not change considerably during the period in which the particles are nucleated. It is particularly favourable to separate the particles from the reaction medium and clean them of additives before they are transferred to stage two of the process.

It is preferable to activate the seed particles produced by dispersion polymerisation by swelling them in a mixture of oil-soluble initiator and monomer before the initiator decomposes and more monomer is dosed for the implementation of the polymerisation. Oil-soluble organic peroxides or azo-type initiators are preferred for use in the first stage as polymerisation initiators. The polymerisation can also be carried out by using residual initiator in the seed particles. It is preferable to carry out stage two with continuous monomer dosing in order to avoid phase separation problems.

It is preferable to use dispersion polymerisation in the first stage for production of the seed particles by using an oil-soluble organic peroxide as the polymerisation initiator and, in the second stage, only to dose the polymerisation medium, stabilisers, monomer and initiator-activator and for the polymerisation in the second stage to be carried out by using residual initiator in the seed particles. The present invention also comprises a PVC mixture, specially for plastisol purposes, which contains spherical PVC particles in the range 10–50 μm, in particular 10–30 μm, with a narrow size distribution, standard paste PVC, 0–100 parts plasticiser, 0.1–10 parts thermostabiliser and 0–100 parts other standard additives for PVC-based products. The spherical particles in the range 10–50 μm may account for 0–100% of the total PVC content of the formulation. It is preferable to use fine-grained products without large agglomerated secondary particles as the standard paste PVC in such mixtures. Such products can be used for thin-film products such as wallpaper, plating and decorating film or for printing ink in gravure or screen printing processes or for processes for textile coating and fixing of cloth.

Spherical PVC particles in the range 10–50 μm, in particular 10–30 μm, with a narrow size distribution, produced according to the present invention, can be used as viscosity reducers in other polymer systems or in liquids where other polymers are not present, as fillers in columns for separation purposes or as basic particles for further chemical modification.

The production of the stated PVC particles with a narrow size distribution takes place in a two-stage process. First a vinyl monomer or a mixture of monomers is polymerised to form a polymer/oligomer seed particle. In a second stage, another vinyl monomer or a mixture of monomers is swelled into the polymer/oligomer seed particles and polymerisation takes place in such a way that they grow into polymer particles of the desired size.

Polymer/oligomer particles of aromatic vinyl monomers or acrylates are advantageous as seed particles for vinyl chloride polymerisation. This is because such particles are relatively easy to produce using known processes to produce the desired size and size distribution. Another advantage is that they can be produced with a given content of oligomer, which produces a dramatic increase in swelling capacity for the vinyl chloride monomer in the second stage. Thus it is possible to ensure final particles with a very low content of seed particles. However, one problem with this two-stage seed process is that the mixture of incompatible systems may lead to phase separation and the production of perfect spherical particles is impossible. One reason for this is the difference in the interfacial tension between the vinyl chloride, polyvinyl chloride and seed. If polystyrene is used as the seed particles, the compatibility between this phase and the polyvinyl chloride will be poor and phase separation will occur with increasing degree of swelling. It is, therefore, more advantageous to use methyl methacrylate as the monomer for the seed particles as polymethyl methacrylate has relatively good compatibility with PVC. PMMA also produces better outdoor stability for the end products than will be produced with aromatic compounds.

However, a special feature of polyvinyl chloride is that the polymer is not soluble in its own monomer. Furthermore, there is also a very great difference in density between the monomer and the polymer (0.91 and 1.39 $g/cm^3$). This has the result that perfectly spherical particles are not formed for PVC above a certain size (approximately 1 $\mu$m) when traditional production techniques are used. One aim of the present invention has been to avoid this problem so that it is possible to produce spherical particles of 10–50 $\mu$m.

The seed particles can be produced in various processes. One possibility is to use the two-stage swelling technique described by Ugelstad (Advances in Colloid and Interface Science, Vol. 13, 101–149, 1980). Such a seed will have a large swelling capacity and the particle size can be controlled easily. At the same time, this method produces a very narrow particle size distribution because it starts with seed particles with a narrow size distribution. However, one restriction exists in that polymerisation in several stages is required to achieve particles of a given size.

Dispersion polymerisation is another method for producing seed particles. This is a relatively new technique described in the literature, see, for example, Shen et al. (Journal of Polymer Science; Part A: Polymer Chemistry, Vol. 31, 1393–1402, 1993) and Paine et al. (Journal of Polymer Science; Part A: Polymer Chemistry, Vol. 28, 2485–2500, 1990). The technique makes it possible directly to produce particles with diameters up to 10 $\mu$m and a narrow size distribution.

According to the present invention, it turned out to be possible to separate the particles from the dispersion medium and transfer them to a new polymerisation medium. They can thus be used as seed in conventional polymerisation processes. This is thus a simple process for producing seed particles with good swelling properties. A further improvement in swelling properties can be produced by using a chain transfer agent during polymerisation so that the molecular weight is reduced to a more favourable level. In many cases, this can be advantageous. Large quantities of solvents and additives are used in the dispersion polymerisation process. A process which involves reusing the reaction medium will therefore be of great advantage. Shen et al. also describe further polymerisation in which polystyrene particles produced by dispersion polymerisation are used as seed, but in this case, the continuous medium is not changed.

The reuse of reaction medium is possible using a direct method in which the particles are separated and the medium used for a new reaction, possibly in a mixture with fresh solution. Another method is to filter or centrifuge out the particles and purify the solvent using known techniques such as distillation. The consumption of solution is thus kept to a minimum. Another advantage of such a separation process is that the particles can, at the same time, be washed and thus transferred to the next polymerisation stage in a completely clean form without the stabilisers from the dispersion process contaminating the seed polymerisation. This is also favourable for the swelling properties of the particles as emulsifier and dispersants on the surface will prevent diffusion into the particles. A further advantage is that there are no restrictions in the choice of stabilisers in the decisive polymerisation and good control of the particle formation is achieved.

In order to avoid the new formation of particles outside the swelled seed particles during polymerisation in the second stage, it is an advantage to have continuous dosing of monomer. With vinyl chloride, therefore, polymerisation takes place at a pressure below the saturation pressure of the monomer at a given temperature. Under such conditions, the monomer will not exist as a separate phase in the reaction medium and the likelihood of secondary nucleation processes is thus very much reduced. Continuous dosing of monomer can, for vinyl chloride, be assured by dosing with a pump which is regulated against the pressure in the reactor. The pressure is kept constant and as the monomer is consumed, monomer is dosed. Another method is to have two reactors connected in series in such a way that the VCM pressure in the reactor with the polymerisation reaction is regulated by regulating the temperature in the other reactor used as the VCM reservoir. In both these methods for continuous dosing, the monomer is dosed in proportion to the reaction speed. Another advantage of such continuous dosing of monomer is that the reaction will take place more rapidly than for standard polymerisation as the work always takes place in the so-called Trommsdorf range. In order for the properties of the finished material to be as good as possible, it is, however, advantageous to keep the pressure as close to the saturation pressure at the polymerisation temperature as possible. Polymerisation which takes place at a pressure considerably below the saturation pressure produces reduced thermal stability in the end product. Another surprising result of this method of carrying out the polymerisation reaction was that the end particles could easily be made completely spherical. Without continuous monomer dosing, the form of the particles was very irregular.

If other monomers with a much lower vapour pressure than vinyl chloride are used, any continuous dosing will take place using another principle such as dosing the monomer as a function of the calculated conversion and a calculation of the composition of the polymer in the existing particles in the reaction medium.

It is also of decisive importance to choose a type of initiator for the polymerisation which produces a desired result. In principle, there is no restriction to the type of initiator which can be used. In practice, the oil solubility and reactivity are adapted to the other reaction conditions. It is an advantage to use fully or partially oil-soluble peroxides or azo-type initiators, possibly in combination with so-called redox systems which make possible more rapid splitting of the initiator and thus a shorter polymerisation cycle. Using a redox system allows for good control and monitoring of the speed of and consumption of the initiator. It will be possible to swell initiators into the seed particles, possibly using a small quantity of solvent or monomer, and they will start the polymerisation reaction inside the particles after the monomer has been dosed. Water-soluble initiators can also be used, but the chance of secondary particle nucleation increases. This is not desirable as is known. Secondary nucleation in the aqueous phase can be prevented by using radical interceptors such as potassium iodide. Another method is to use residual initiator from the production of seed particles to initiate the polymerisation in stage two.

The production of seed particles according to the dispersion method is described with the use of azo-initiators or peroxide. A disadvantage of the azo types is that the residues of initiator in the end product function as a foaming agent in connection with the production of PVC products and special precautions must therefore be taken for commercial purposes. Residues of initiator may be decomposed before drying of filler PVC particles, but this requires major thermal stress with resulting reduced thermal stability and irregular distribution of molecular weight. A solution to this problem would be to use a known peroxide initiator for standard PVC production. As shown in the below examples, it turned out to be possible to produce seed particles with an oil-soluble peroxide. In connection with the adaptation of the reaction conditions and the initiator concentration, it also turned out to be possible to obtain enough residual initiator in the seed particles to be able to complete the polymerisation in other stages.

Another important element in order to achieve a successful result for particle production is the choice of stabiliser systems which keep the particles freely dispersed in the reaction medium. The present invention has no restrictions in the choice of such substances. Both standard emulsifiers of anionic or non-ionic types known from the emulsion polymerisation area and polymer suspension agents of the types polyvinyl alcohol, polyvinyl pyrrolidone, styrene maleic anhydride copolymers and various types of cellulose such as methylhydroxyethyl cellulose and methylhydroxypropyl cellulose are used. One particularly advantageous possibility which is provided by the use of PVC particles according to the present invention is the use of polymer suspension agents instead of low-molecular and ionic emulsifiers during particle production.

On account of the completely special particle size and the particle size distribution, the particles according to the present invention can account for the majority and also the full proportion of PVC in the formulations for the end products. Thus finished PVC products avoid disadvantages such as high water absorption and content of volatile substances which usually accompany standard paste PVC products produced by means of traditional emulsifiers for the production of paste PVC.

The present invention is illustrated in further detail by the following examples and the attached FIGS. 1–4.

Figure 1:
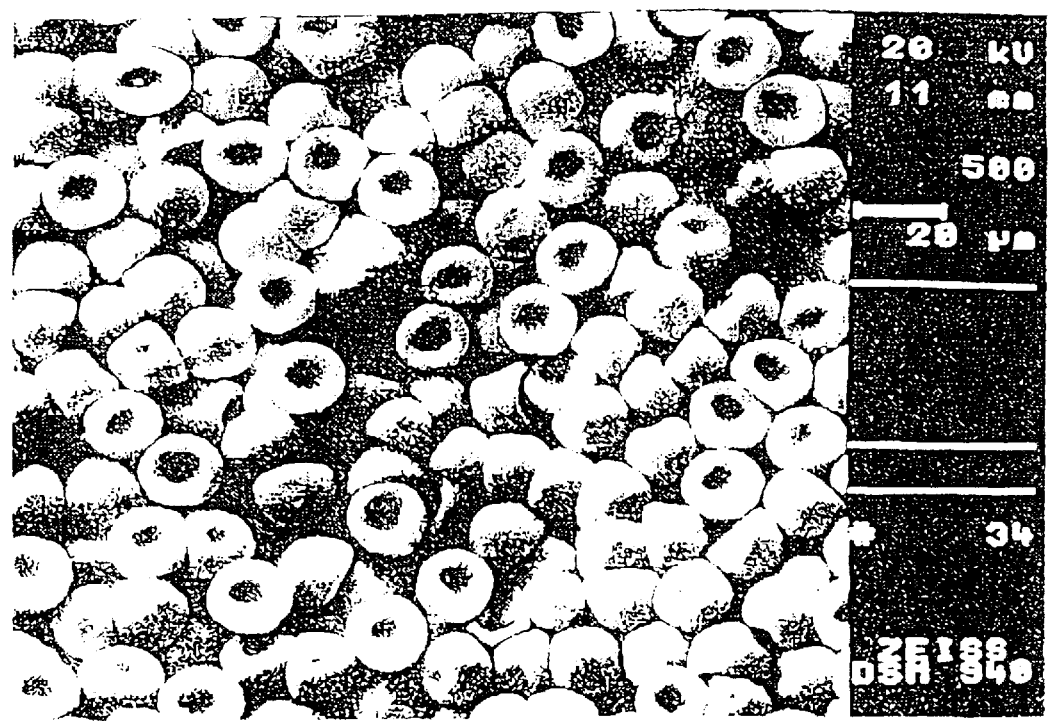
FIG. 1 is a microphotograph of, the particles produced as in example B-1.

A 1.1-liter or 5-liter thermostat-controlled glass reactor with reflux is used in examples A-1 to A-7. An isothermic reaction calorimeter (CPA-2, ThermoMetrics, Sweden) with a reactor with a volume of 200 ml or a 1.1-liter or 1.4-liter thermostat-controlled glass reactor or a 14-liter steel reactor is used in examples B-1 to B-17.

Production of Seed Particles

Test A-1 Oligomer seed of polystyrene.

Monodisperse oligomer particles of PS were produced in the two-stage method described by Ugelstad (Advances in Colloid and Interface Science, Vol. 13, 101–149, 1980). An emulsion of dioctanoyl peroxide (20 g), acetone (28 g), sodium lauryl sulphate (1.38 g) and distilled water (235 g) was added to a latex of oligomer seed (17 g latex=2.0 g seed) with particle size 1 $\mu$m. The emulsion was swelled into the seed particles in the course of 72 hours at 25° C. Then styrene monomer (31 g), distilled water (120 g) and potassium iodide (0.2 g) were added and the polymerisation was carried out at 70° C. for 165 minutes. Seed particles of 2.2 $\mu$m were achieved. This seed was further swelled with an emulsion of dioctanoyl peroxide (2.03 g), sodium lauryl sulphate (0.34 g) and distilled water (68 g). The swelling took place for 72 hours at 25° C. and the finished, activated seed had a diameter of 3 $\mu$m.

Test A-2 Oligomer seed of polymethyl methacrylate.

Oligomer seed of PS produced using the Ugelstad method (1 $\mu$m, 2.0 g) was swelled with an emulsion of dioctanoyl peroxide (20 g), sodium lauryl sulphate (1.38 g), acetone (28 g) and distilled water (258 g) for 72 hours at 25° C. Methyl methacrylate (31 g) was then swelled into the activated seed particles and the polymerisation was carried out at 65° C. for 120 minutes. The finished seed had a diameter of 3 $\mu$m.

Test A-3 Dispersion seed of polymethyl acrylate.

A dispersion polymerisation of MMA was carried out in methanol with poly(vinyl pyrrolidone) ($M_w$=40000) as the stabiliser. The initiator was 2.2'-azobis(isobutyronitrile). 2-ethylhexylthioglycolate was used as the chain transfer agent to reduce the molecular weight. The recipe for the test is shown in table 1.

TABLE 1

Recipe for dispersion polymerisation of methyl methacrylate.

| Materials | Weight % |
| --- | --- |
| MMA | 10–15 |
| Methanol | 80–85 |
| PVP K-30 | 2.5–5.0 |
| AIBN | 0.1–0.4 |
| 2-ethylhexylthioglycolate | 0.0–0.6 |

Polymerisation temperature: 55° C. Polymerisation time: 48 hours.

Weight % is based on the total recipe.

PVP K-30=poly(vinyl pyrrolidone) Mw=40000 g/mol.

AIBN=2.2'-azobis(isobutyronitrile).

PVP and methanol are heated to boiling point and the solution is boiled for 1 hour in an N2 atmosphere. The mixture is cooled to 55° C. and MMA is added. When a stable temperature of 55 degrees has been reached, a solution of AIBN in methanol is added. Polymerisation is carried out for 48 hours at constant temperature. The chain transfer agent can be added at any time during the process.

Depending on the exact recipe used, particles in the range 0.5 to 10 μm are produced, and in all cases the size distribution was narrow. When the chain transfer agent was used, seed particles with a larger diameter and a somewhat wider size distribution were produced. The exact size of the dispersion seed of PMMA produced and used in each case is stated in the examples of production of PVC particles.

When the chain transfer agent was used, the procedure was that a solution of PVP K-30 (10.00 g) in methanol (175.75 g) was added to the reactor and the mixture was boiled in an N2-atmosphere for 1 hour. The mixture was cooled to 55° C. before methyl methacrylate (25.00 g) was added. A mixture of 2-ethylhexylthioglycolate (0.15 g), 2.2-azobis(isobutyronitrile) (0.30 g) and methanol (39.00 g) was added to the reactor when the temperature was stable at 55° C. The polymerisation was carried out at 55° C. for 48 hours.

Spherical particles with diameter 12.5 μm were achieved, with a small fraction which was 4 μm.

Test A-4 Polystyrene dispersion seed with dioctanoyl peroxide.

A solution of polyvinyl pyrrolidone (PVP K-30) (5.15 g) in ethanol (236.07 g) was heated to boiling point and boiled for 1 hour in an N2-atmosphere. The temperature was regulated to 70° C. and styrene (78.04 g) was added. When the temperature was stable at 70 degrees, a mixture of dioctanoyl peroxide (4.08 g) and ethanol (35.24 g) was added and polymerisation carried out at 70° C. for 24 hours.

The particles produced had a diameter of 5 μm.

Test A-5 Polymethyl methacrylate dispersion seed with didecanoyl peroxide.

A solution of PVP K-30 (93.75 g) in methanol (2635 g) was added to the reactor and the mixture was boiled for 1 hour in an N2-atmosphere. The mixture was cooled to 55° C. before methyl methacrylate (375 g) was added. A mixture of didecanoyl peroxide (18.77 g) and methanol (585 g) was preheated to 30° C. and charged to the reactor. The polymerisations were carried out at 55° C. for 15 to 24 hours.

The particles produced had a diameter of 8 μm.

Test A-6 Polymethyl methacrylate dispersion seed with didecanoyl peroxide.

A solution of PVP K-30 (18.75 g) in methanol (644.25 g) was added to the reactor and the mixture was boiled for 1 hour in an N2-atmosphere. The mixture was cooled to 55° C. before methyl methacrylate (75 g) was added. A mixture of didecanoyl peroxide (3.75 g) and methanol (116.87 g) was preheated to 30° C. and charged to the reactor. The polymerisation was carried out at 55° C. for 24 hours.

The particles produced had a diameter of 7 μm.

Test A-7 Activated polystyrene dispersion seed.

A solution of PVP K-30 (5.15 g) in ethanol (240.11 g) was added to the reactor and the mixture was boiled for 1 hour in an N2-atmosphere. The mixture was cooled to 70° C. before styrene (78.04 g) was added. A mixture of 2.2-azobis (isobutyronitrile) (2.34 g) and ethanol (31.20 g) was added to the reactor when the temperature was stable at 70° C. The polymerisation was carried out at 70° C. for 24 hours.

The particles produced had a diameter of 6.0 μm.

Some of these seed particles (5.0 g) in distilled water (25.40 g) were further swelled with an emulsion of dioctanoyl peroxide (0.5 g), sodium lauryl sulphate (0.083 g) and distilled water (16.67 g). The swelling took place for approximately 20 hours at 25° C. and the finished, activated seed had a diameter of 6.2 μm.

Production of PVC particles in the range 10 to 50 μm with seed-based polymerisation.

Test B-1

Methylhydroxypropyl cellulose dissolved in distilled water (2 g/l, 66.25 g), sodium lauryl sulphate (0.05 g) and activated oligomer seed from example A-1 (0.26 g) were heated to 25° C. N2-gas was added at a pressure of 9 bar. The reactor was then evacuated in order to remove oxygen. VCM (18.75 ml) was added and was allowed to swell into the seed particles for 60 minutes. A solution of methylhydroxypropyl cellulose in distilled water (2 g/l, 33.75 g) and potassium iodide (0.038 g) was added to the reactor before the temperature was increased to 55° C. Polymerisation began and continued until a pressure drop of 2.5 bar was registered in the reactor. The reaction was then stopped by the reactor being cooled to 20° C. and unconverted monomer was vented.

The particles produced had a concave surface as shown in FIG. 1. The diameter was approximately 15 μm.

Test B-2

Methylhydroxypropyl cellulose dissolved in distilled water (10 g/l, 100 g), sodium lauryl sulphate (0.05 g), potassium iodide (0.038 g) and oligomer seed from example A-1 (0.52 g) were heated to 30° C., the reactor was filled with N2 and the oxygen was removed as in B-1. VCM (15 ml), vinyl acetate (5 ml) and a solution of azobismethylbutyronitrile (0.25 g) and methanol (0.25 g) were added to the reactor and were allowed to swell into the seed particles for 60 minutes. The temperature was then increased to 55° C. and the same procedure as in B-1 was followed. The particles produced were spherical with a diameter of approximately 7 μm.

Test B-3

Precisely the same procedure as in B-2 was followed, with the difference that the quantity of VCM was increased from 15 ml to 18 ml and the quantity of vinyl acetate was reduced from 5 ml to 2 ml. The solution of methylhydroxypropyl cellulose had a concentration of 6 g/l. The particles produced had a concave surface and a diameter of approximately 10 μm.

Test B-4

Seed particles from example A-2 (0.25 g), sodium lauryl sulphate (0.05 g), potassium iodide (0.038 g) and methylhydroxypropyl cellulose in distilled water (5 g/l, 100 g) were charged to the reactor. The same procedure as in B-1 was followed. VCM (18.8 ml) was added and was allowed to swell into the seed particles for 60 minutes at 25° C. Polymerisation was carried out at 60° C. until a pressure drop of 2.5 bar was achieved. Spherical particles with diameter 13 μm were produced.

Test B-5

The procedure in B-4 was followed with the difference that activated polystyrene seed from example A-4 (0.26 g) was used as seed particles. Concave particles with diameter approximately 16 μm were produced.

Test B-6

Seed particles from example A-3 (6.8 μm, 1.0 g), sodium lauryl sulphate (0.05 g), potassium iodide (0.038 g) and methylhydroxypropyl cellulose in distilled water (2 g/l, 100 g) were charged to the reactor. After removing the oxygen, VCM (17 ml) and a solution of azobismethylbutyronitrile (0.25 ml) and methanol (0.25 g) were added and were allowed to swell into the seed particles for 60 minutes. Polymerisation was carried out at 60° C. until a pressure drop of 2.5 bar was achieved. Spherical particles with diameter approximately 11 μm were produced.

Test B-7

The procedure from B-7 was followed with the difference that 34 ml VCM was added instead of 17 ml. Particles with a concave surface and size approximately 14 μm were produced.

Test B-8

Seed particles from example A-3 with 2-ethylhexythioglycolate (0.15 g), (12.5 µm, 2.00 g), sodium lauryl sulphate (0.05 g), potassium iodide (0.038 g) and methylhydroxypropyl cellulose in distilled water (2 g/l, 100 g) were added to the reactor and the oxygen was removed before VCM (20 ml) and a solution of 2.2-azobis (isobutyronitrile) (0.25 g) and methanol (0.25 g) were added. After swelling into the seed particles for 3 hours, the temperature was increased to 60° C. and polymerisation was carried out until a pressure drop of 2.5 bar was achieved. Spherical particles with diameter 20 µm and a small fraction of smaller particles were produced.

Test B-9

Seed particles from example A-3 (6.8 µm, 1.0 g), sodium lauryl sulphate (0.05 g), potassium iodide (0.038 g) and methylhydroxypropyl cellulose in distilled water (2 g/l, 100 g) were charged to the CPA reactor. After the removal of oxygen, VCM (7 ml) and a solution of azobismethylbutyronitrile (0.35 g) and methanol (0.35 g) were added and were allowed to swell into the seed particles for 60 minutes. The temperature was increased to 60° C. and VCM (20 ml) was then dosed continuously to the reactor using a piston pump. The pressure in the reactor was thus kept constant just below saturation pressure at 60° C. The reaction continued until a pressure drop of a total of 2.5 bar was achieved.

Spherical particles with diameter approximately 18.5 µm were produced. Examination under a scanning electron microscope (SEM) showed that small particles were adsorbed to the surface of the spherical particles. This was on account of new particles formed from the aqueous phase as described earlier.

Test B-10

Seed particles from example A-3 (6.8 µm, 2.2 g), sodium lauryl sulphate (0.33 g), potassium iodide (0.25 g) and methylhydroxypropyl cellulose in distilled water (2 g/l, 650 g) were added to the reactor. After evacuation, VCM (37.5 ml) and a solution of azobismethylbutyronitrile (1.0 g) and methanol (1.0 g) were added and were allowed to swell into the seed particles for 60 minutes. The temperature was increased to 60 degrees and then VCM (94.5 ml) was added by means of continuous dosing via a piston pump. The dosing was regulated so that the pressure was constant just below saturation pressure. The polymerisation was concluded when a pressure drop of 2.5 bar was achieved.

Spherical particles with diameter approximately 18 µm were produced. Again, small adsorbed particles were observed on the surface.

Test B-11

Seed particles from example A-3 (7.2 µm, 6.1 g), sodium lauryl sulphate (0.28 g), potassium iodide (0.21 g) and methylhydroxypropyl cellulose in distilled water (2 g/l, 550 g) were added to the reactor. After evacuation, VCM (20 ml) and a solution of azobismethylbutyronitrile (1.0 g) and methanol (1.0 g) were added and were allowed to swell into the seed particles for 60 minutes. The temperature was increased to 60 degrees and VCM (160 ml) was added continuously as in B-9. Polymerisation was carried out until a pressure drop of 2.5 bar was achieved.

Figure 2:
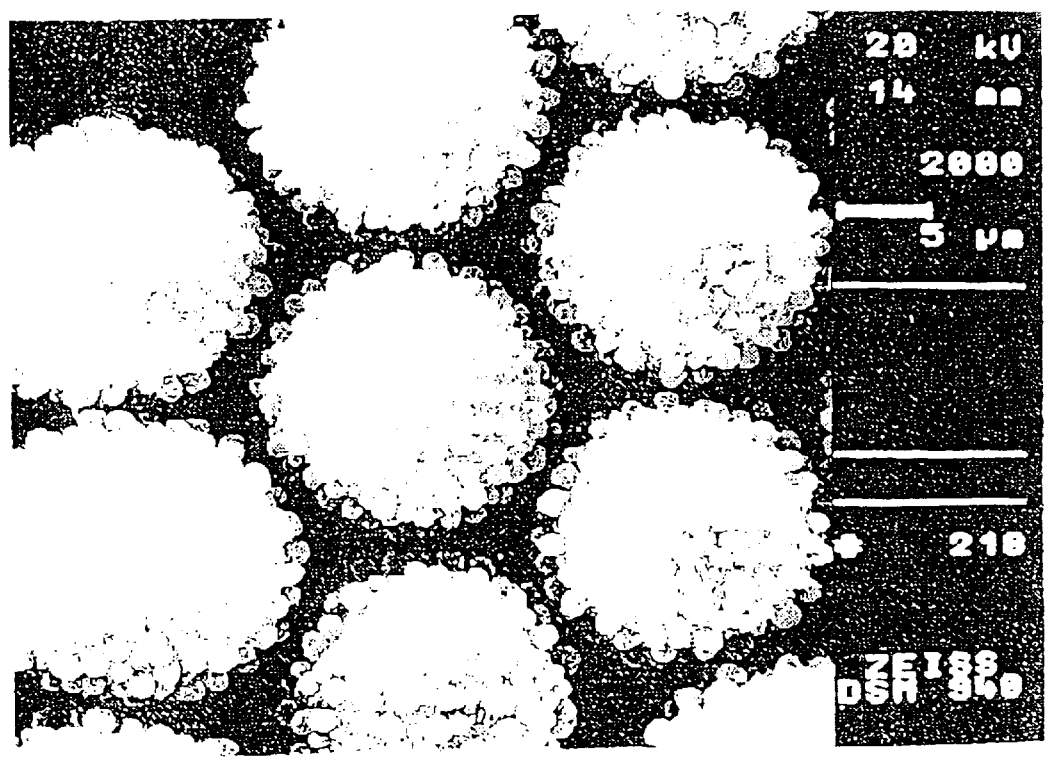
FIG. 2 is a microphotograph of, the particles produced as in example B-11.

Spherical particles of 18 µm were produced. Small adsorbed particles were observed on the surface as shown in FIG. 2.

Test B-12

Seed particles from example A-3 (1.0 µm, 10.3 g), sodium lauryl sulphate (0.28 g), potassium iodide (0.21 g) and methylhydroxypropyl cellulose in distilled water (2 g/l, 550 g) were added to the reactor. After evacuation, VCM (20 ml) and a solution of azobismethylbutyronitrile (1.0 g) and methanol (1.0 g) were added and were allowed to swell into the seed particles for 60 minutes. The temperature was increased to 60 degrees and VCM (155 ml) was dosed continuously as in B-9. Spherical particles of 3 µm were produced.

Test B-13

Two 14-liter reactors were connected in series. Reactor 1 was charged with methylhydroxypropyl cellulose (13.00 g) dissolved in water (6056 g), potassium iodide (2.47 g) and PMMA dispersion seed (8 µm, 100 g) produced in example A-3. Reactor 1 was heated to 30° C. Both reactors were evacuated to remove oxygen and the connection between them was closed with a valve. VCM (2890 ml) was added to reactor 2.

Azobismethylbutyronitrile (22.82 g) dissolved in methanol (22.82 g) was added to reactor 1 together with VCM (300 ml). After 1 hour of the VCM and initiator swelling into the seed particles, the temperature was increased to 60° C. Reactor 2 was heated to 57° C. At stable temperature in reactor 1, the valve was opened and the temperature in reactor 2 regulated against the pressure in reactor 1 so that it was kept constant until the VCM disappeared as a separate phase in the system. The temperature range for reactor 2 was 57 to 65 degrees.

Figure 3:
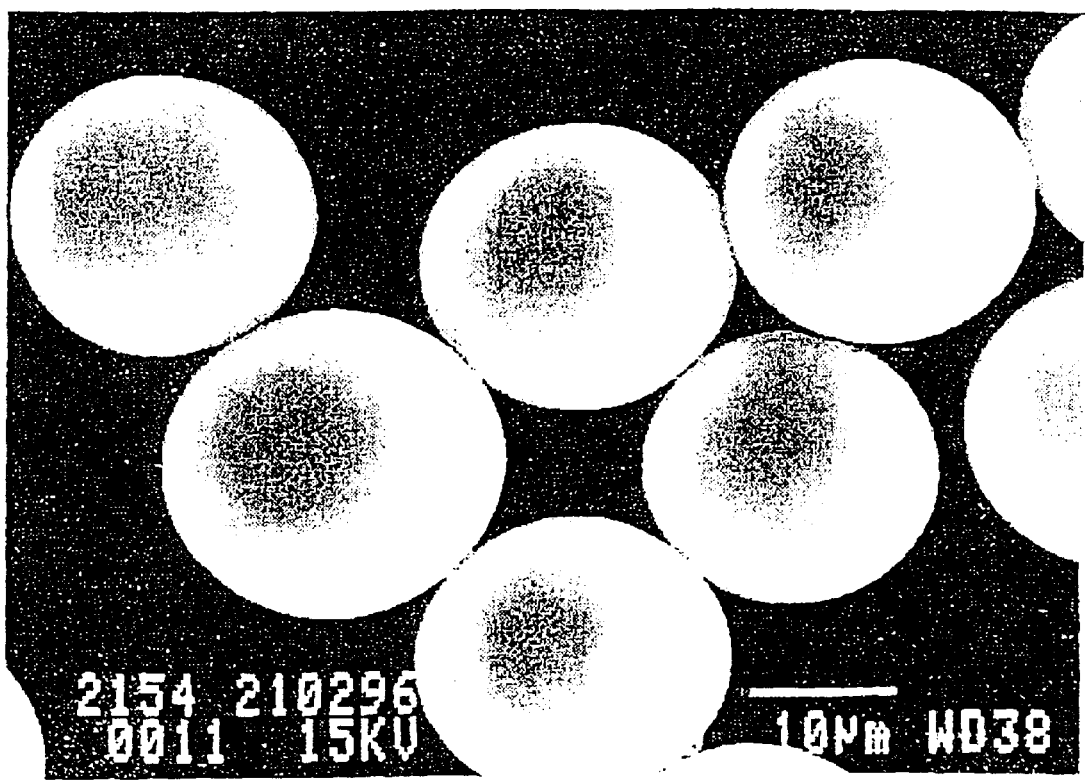
FIG. 3 is a microphotograph of, the particles produced as in example B-13.

Spherical particles with diameter 25 µm with a uniform surface as shown in FIG. 3 were produced.

Test B-14

Two 14-liter reactors were connected in series. Reactor 1 was charged with methylhydroxypropyl cellulose (13.00 g) dissolved in water (6056 g), potassium iodide (2.47 g), sodium lauryl sulphate (11.21 g) and PMMA dispersion seed (8 µm, 100 g) produced in example A-3. Reactor 1 was heated to 30° C. Both reactors were evacuated to exclude oxygen and the connection between them was closed with a valve. VCM (2890 ml) was added to reactor 2. Azobismethylbutyronitrile (22.82 g) dissolved in methanol (22.82 g) was added to reactor 1 together with VCM (300 ml). After 1 hour of the VCM and initiator swelling into the seed particles, the temperature was increased to 60° C. Reactor 2 was heated to 57° C. At stable temperature in reactor 1, the valve was opened and the temperature in reactor 2 regulated against the pressure in reactor 1 so that it was constant until the VCM disappeared as a separate phase in the system. The temperature range for reactor 2 was 57 to 65 degrees.

Spherical particles with diameter 15 µm with a non-uniform surface consisting of precipitated secondary particles were produced.

Test B-15

Seed particles from example A-6 (7.0 µm, 7.50 g) which contained initiator, sodium lauryl sulphate (0.25 g), potassium iodide (0.19 g), methylhydroxypropyl cellulose in distilled water (2 g/l, 1.00 g), copper sulphate pentahydrate (2.00 mg) and water (630.40 g) were added to the reactor. After evacuation, VCM (20 ml) was added and was allowed to swell into the seed particles for 60 minutes. The temperature was increased to 60 degrees and VCM (130 ml) was dosed continuously with a piston pump. In order to control the reaction speed, a solution of ascorbic acid (4 g/l, 2.00 ml) was dosed. The reaction was continued until a pressure drop of 2.5 bar was achieved.

Spherical particles of 13 µm were produced.

Test B-16

Activated seed particles of polystyrene from example A-7 (6.2 µm, 1.00 g), potassium iodide (0.038 g) and methylhydroxypropyl cellulose in distilled water (2 g/l, 100 g) were added to the reactor. After the removal of oxygen, VCM (7 ml) was added and was allowed to swell into the seed particles for 60 minutes. The temperature was increased to 60° C. and VCM (22.5 ml) was then dosed continuously to the reactor using a piston pump. The reaction was continued until a pressure drop of 2.5 bar was achieved.

Particles with a diameter of approximately 15 μm were produced. The particles had a non-uniform surface and were not spherical.

Figure 4:
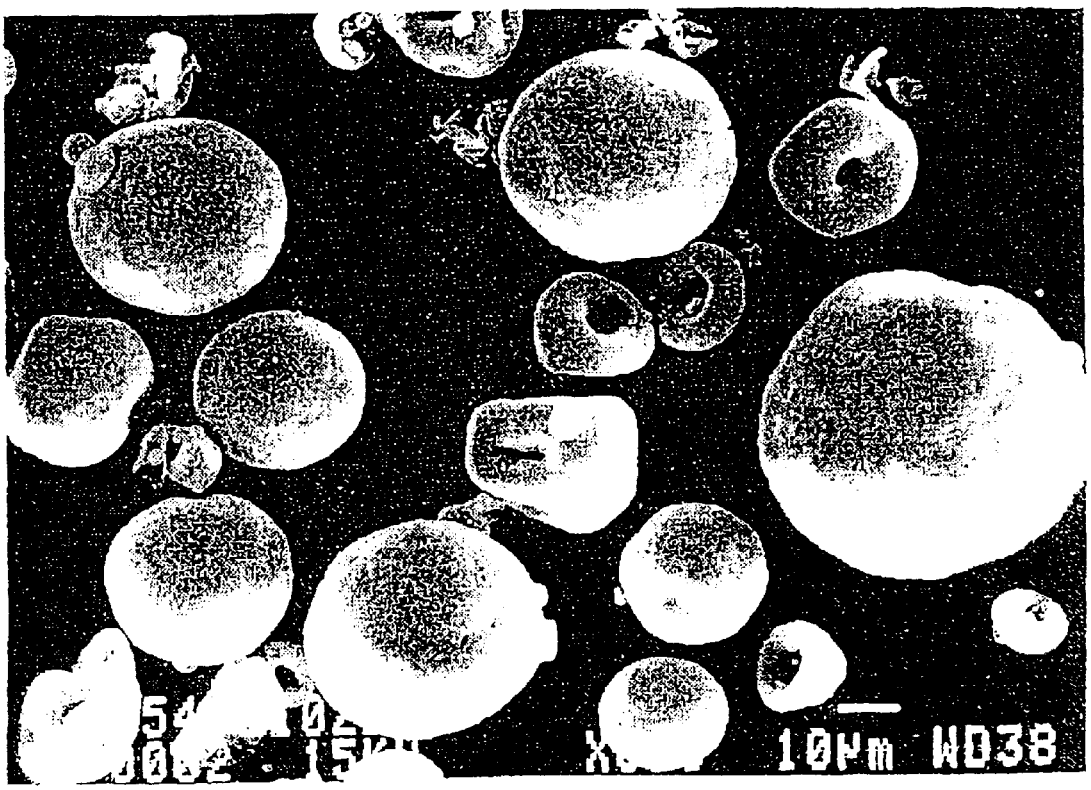
FIG. 4 is a microphotograph of, commercial filler PVC, Vinnol C65 V.

For comparison, FIG. 4 shows commercial filler PVC, Vinnol C65V, from Vinnolit GmbH.

The use of PVC particles produced using the present invention is illustrated in the following examples;

Test C-1

PVC pastes were produced according to the formulations stated in table 2. PVC powder was mixed with plasticiser and liquid thermostabiliser in a Warring rapid mixer. Mixing took place for 10 minutes at increasing speed at a final temperature of 35° C. The viscosity of the pastes was measured in a rheometer of type Bohlin VOR, C14 measurement system, at increasing shear rates from 1 to 300 per second. The particle size of the dispersed PVC particles was measured by spreading a thin film of the pastes on a grindometer ( rod). The particle size is stated here at the point at which stripes occur in the thin film. The films were plasticised in a Werner-Mathis furnace at 200° C. for 3 minutes. The films were inspected for any foaming. The water absorption in the films was measured as weight increase after storage in water at 50C for 48 hours.

TABLE 2

Formulations for PVC pastes in example C-1.

| Ingredients | F-1 | F-2 | F-3 | F-4 | F-5 | F-6 | F-7 | F-8 | F-9 |
|---|---|---|---|---|---|---|---|---|---|
| Pevikon P14 | 70 | 70 | 70 | 70 | 70 | — | — | — | — |
| Pevikon DP1502 | — | — | — | — | — | 30 | 30 | 30 | 30 |
| Vinnol C65V | 30 | — | — | — | — | 70 | — | — | — |
| MM-11 | — | 30 | — | — | — | — | 70 | — | — |
| MM-15 | — | — | 30 | — | — | — | — | 70 | — |
| MM-14 | — | — | — | 30 | — | — | — | — | 70 |
| MM-13 | — | — | — | — | 30 | — | — | — | — |
| DOP | 40 | 40 | 40 | 40 | 40 | 40 | 40 | 40 | 40 |
| LZ616 | 2 | 2 | 2 | 2 | 2 | 2 | 2 | 2 | 2 |
| ESO | 2 | 2 | 2 | 2 | 2 | 2 | 2 | 2 | 2 |

Pevikon P14: standard paste PVC, Norsk Hydro a.s
Pevikon DP1502: development product, fine-grained paste PVC, Norsk Hydro a.s
Vinnol C65V: extender PVC (filler PVC), Vinnoilt GmbH
DOP: diethylhexyl phthalate
LZ616: barium zinc stabiliser, Ackros
ESO: epoxidised soya bean oil
MM-11: particles produced in example B-11

TABLE 2-continued

Formulations for PVC pastes in example C-1.

| Ingredients | F-1 | F-2 | F-3 | F-4 | F-5 | F-6 | F-7 | F-8 | F-9 |
|---|---|---|---|---|---|---|---|---|---|

MM-13: particles produced in example B-13
MM-14: particles produced in example B-14
MM-15: particles produced in example B-15

Table 3 shows the viscosities and particles sizes for the 9 formulations. It can be clearly seen that the samples with PVC particles produced according to the present invention offer opportunities for spreading films which are thinner than 50 microns. Even when as much as 70 phr of the content of the PVC is filler PVC, very thin films are produced. At the same time, low-viscosity pastes are produced. The importance of having perfectly spherical particles with a uniform surface can clearly be seen in a comparison of the viscosities for formulations 1, 2, 3 and 4. Sample MM-14 had irregularities in the form of precipitated particles on the surface. The viscosity was very high. It can also be seen that, in this case, it was not possible to disperse the particles completely down to their primary particle level and the smear on the grindometer showed a particle size of 75 μm.

TABLE 3

Viscosity, particle size and water absorption.

| Viscosity (Pas) | F-1 | F-2 | F-3 | F-4 | F-5 | F-6 | F-7 | F-8 | F-9 |
|---|---|---|---|---|---|---|---|---|---|
| at 1 pers. | 11 | 10 | 11 | 19 | 12 | 9 | 10 | 11 | 5 |
| at 10 pers. | 12 | 12 | 14 | 23 | 12 | 8 | 9 | 11 | 5 |
| at 100 pers. | 18 | 23 | 29 | 40 | 18 | 8 | 9 | 13 | 5 |
| at 300 pers. | - | - | - | - | - | 19 | 7 | 9 | 11 | 5 |
| Particle size (μm) | 75 | 35 | 45 | 75 | 50 | 75 | 25 | 25 | 40 |
| Appearance of the film | OK | foam | OK | foam | — | OK | foam | OK | |
| Water absorption (%) | 1.8 | 2.2 | 2 | 1.9 | — | 0.8 | 1.5 | 1 | |

In combination with very fine-grained standard paste PVC (Pevikon DP1510), filler PVC gives particles according to the present invention the unique opportunity to produce films down to 50 micrometers at the same time as the viscosity of the paste is low and the rheology is Newtonian even though only 44 phr liquid substance are used in the formulation (F-7, 8 and 9). Up to now, this has not been possible with known PVC types for plastisol purposes.

What is claimed is:

1. A process for producing PVC particles in the range of 10 to 50 μm, which comprises:

a) in a first stage, polymerizing an aromatic vinyl monomer, acrylates or a mixture of vinyl monomers to form polymer/oligomer seed particles in the range of 1 to 10 μm by dispersion polymerization or two-stage swelling polymerization, after which b) in a second stage, swelling vinyl chloride monomer or a mixture of monomers consisting essentially of vinyl chloride monomer into the polymer/oligomer seed particles in an aqueous medium, and polymerizing said monomer.

2. The process according to claim 1 wherein the seed particles in the first stage are produced by a two-stage swelling process.

3. The process according to claim 1 wherein the seed particles in the first stage are produced by dispersion polymerization.

4. The process according to claim 3 wherein the dispersion polymerization is initiated by adding an initiator dissolved in the solvent as a preheated solution.

5. The process according to claim 1 wherein the particles of the first stage are separated from a reaction medium and are washed clean of any additives before being transferred to the second stage of the process.

6. The process according to claim 1, wherein before polymerization of the second stage, the seed particles are activated by swelling in an oil-soluble initiator or a mixture of oil-soluble initiator with monomer and/or solvent before the initiator decomposes and monomer is dosed for the implementation of the polymerization.

7. The process according to claim 1 wherein an organic peroxide and/or azo-type initiator is used as a polymerization initiator.

8. The process according to claim 1 wherein the polymerization of the second stage is carried out using a residual initiator from the first stage.

9. The process according to claim 1 wherein the second stage is carried out with continuous dosing of monomer in order to avoid phase separation problems.

10. The process according to claim 1 wherein an initiator activator is dosed in the second stage.

11. The process according to claim 1 wherein the produced PVC particles are in the range of 10 to 30 $\mu$m.

* * * * *